June 12, 1956

L. SAIVES 2,750,538

SAFETY DEVICE FOR HAND-CONTROLLED MACHINES

Filed July 17, 1953

INVENTOR
LEON SAIVES
BY
ATTORNEY

United States Patent Office 2,750,538
Patented June 12, 1956

2,750,538

SAFETY DEVICE FOR HAND-CONTROLLED MACHINES

Leon Saives, Billancourt, France, assignor to Regie Nationale des Usines Renault, Billancourt, France Application July 17, 1953, Serial No. 368,581

Claims priority, application France August 1, 1952

7 Claims. (Cl. 317—135)

This invention relates to safety devices and more particularly to a safety device applicable to any hand-controlled machine the operation of which is deemed dangerous during a predetermined portion of its cycle. The basic idea of the invention consists in securing the operator's safety during the hand control of machines of this type—for example pressure—by compelling the operator to press simultaneously and with both hands two different members, for instance press-buttons or control levers. In other words, two press-buttons or control levers are provided for the operator and the arrangement is such that the machine cannot operate unless the operator presses these press-buttons or control levers with both hands and approximately at the same time.

The device of this invention meets the following requirements:

(a) If the operator depresses one button only, the operative member or members of the machine cannot be started or actuated;

(b) If the operator depresses one button and waits too much before depressing the other button, the operative member or members of the machine will also remain still. The maximal time period allowed between the respective moments in which the first and then the other press-buttons or like control members are actuated may be adjusted within certain limits. This period may be of the order of two seconds. Thus, if the operator made a wrong move, for instance by depressing a button inadvertently, the operative member or members of the machine will remain unactuated. However, a very short time after releasing this button the safety device will again be ready to operate. In the device according to this invention this time is extremely short, of the order of $\frac{1}{50}$ of a second for example, so that the restoring of normal operating conditions after releasing the button may be considered as instantaneous.

These results are obtained by using an interlocking system employing electron tubes which—in the specific case contemplated herein—are energized with single-phase alternating current, for example of a 220-volt voltage and a 50-C. P. S. frequency; however, any other alternating voltage may be used, as well as any other frequency in the 25 to 100-C. P. S. range. Preferably, the electron tubes used in the device are of the Thyratron type 2.050 (industry) or 2.D21 (miniature).

The attached drawings forming part of this specification illustrate diagrammatically by way of example a few forms of embodiment of the invention utilizing a 220-volt, 50-C. P. S. alternating current. In the drawings.

Figure 1:
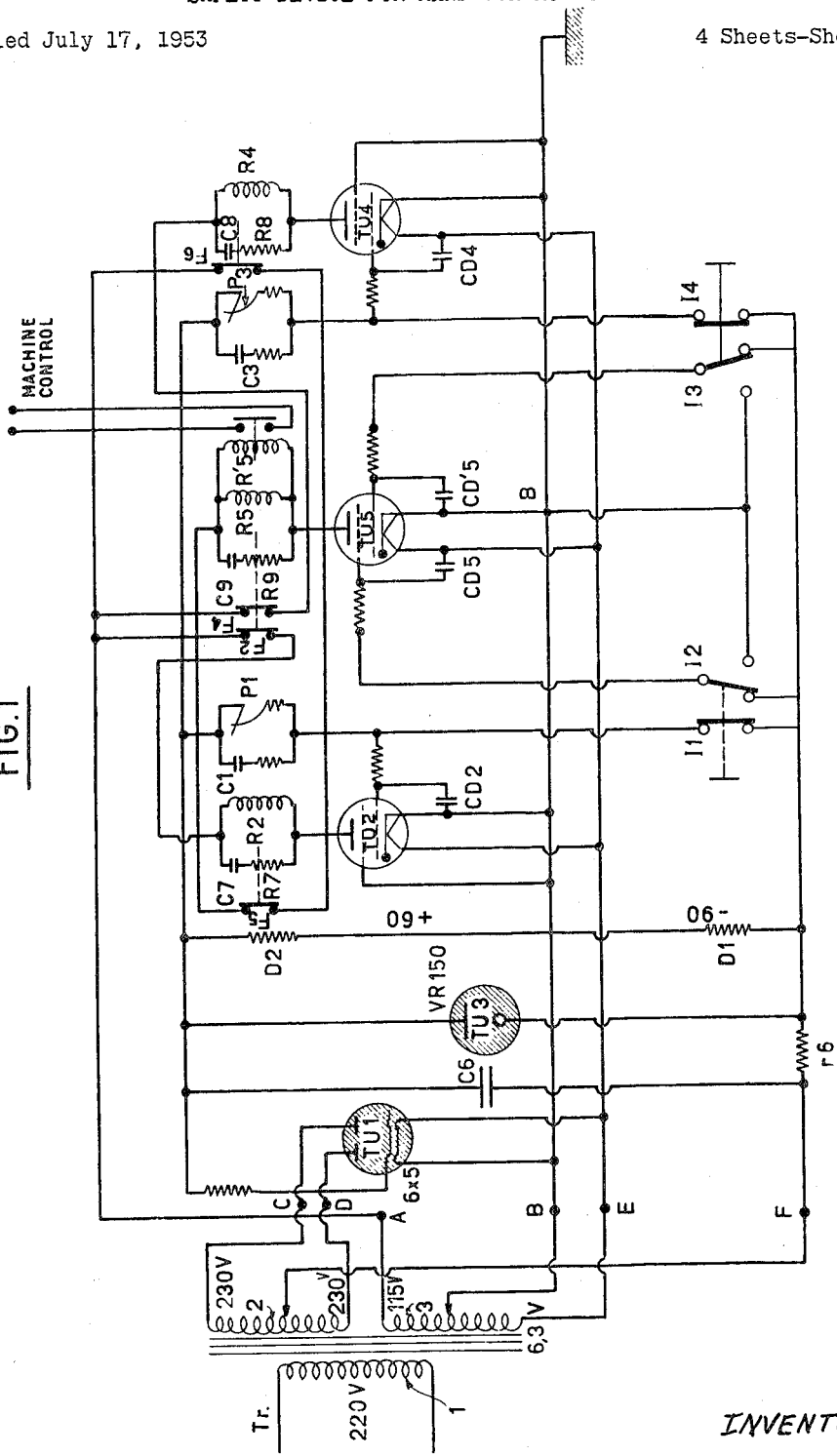
Figure 1 is a wiring diagram showing a device utilizing D. C. regulated to 150 volts.

Referring first to the diagram of Fig. 1, the device shown therein comprises essentially:

An input transformer Tr having a plurality of input terminals to permit its connection to any type of single-phase alternating network and the primary 1 of which is fed in this case from a source of 220-volt, 50-C. P. S. single-phase alternating current; this transformer comprises two secondaries 2 and 3 having the following functions:

Across the 230-volt terminals C and D of the secondary 2 there is connected a double-diode tube T$u$1 adapted to supply a 150-volt rectified current, and across the end terminal A and the center tap B of the secondary 3 is a single-phase 110-volt circuit is also connected, as shown; besides across the aforesaid terminal B and the other end terminal E of the same secondary are connected the filaments of electron tubes to be described presently;

A rectifying system for converting alternating current into direct current, comprising the aforesaid double-diode tube T$u$1 already mentioned, with a 460-volt alternating current voltage at the center tap F, and a 150-volt D. C. regulated output voltage. In addition to this tube T$u$1, this system includes a filter consisting of a capacitor $C_6$, an induction coil or resistor $r_8$ and a regulator tube VR150 designated by the reference symbol T$u$3;

A D. C. voltage divider consisting of a pair of resistors $D_1$ and $D_2$ the center tap of which is grounded to zero voltage, with end terminals having a —90 volt voltage for $D_1$ and +60 volt voltage for $D_2$ with respect to ground;

Two electronic circuits each comprising:

(a) A capacitor-potentiometer system $C_1$—$P_1$ or $C_3$—$P_3$ connected across the terminals of the 150-volt network, the circuit of this system including a hand-controlled switch $I_1$ or $I_4$;

The purpose of this system is to apply a negative bias voltage to the grid of the Thyratron tube 2.050 designated in T$u$2 or T$u$4 and to be described presently, with respect to the cathode thereof;

(b) A circuit connected across the center tap of the voltage divider and the A. C. 110-volt supply, this circuit comprising in series:

($b^1$) A thyratron tube T$u$2 or T$u$4 type 2.050;

($b^2$) A relay $R_2$ or $R_4$ having connected across its terminals a capacitor $C_7$ or $C_8$ and a resistor $R_7$ or $R_8$ in series with each other, whereby the movable circuit of the relay may be closed without beating, and a relay back contact $F_2$ or $F_4D$. It will be noted that the relays $R_2$ or $R_4$ serve only as a means for locking the safety device;

An electronic circuit connected on the one side to the center tap B of the voltage divider and on the other side to the 110-v. A.-C. supply, and comprising:

(a) A thyratron tube T$u$5 type 2.050;

(b) Two switches $I_2$ or $I_3$ controlling the biasing of the grids of this tube;

(c) A double relay $R_5$—$R'_5$ having connected across its terminal a capacitor $C_9$ and a resistor $R_9$ in series with each other and, in series with this assembly, a pair of relay back contacts $F_5$, $F_6$ controlled by the relays $R_2$ and $R_4$, respectively, the contacts $F_2$ and $F_4$ being controlled by the relay $R_5$ alone.

This double relay $R_5$—$R'_5$ is adapted to control directly the supply of current to the starting mechanism or motor of the machine on which the safety device is mounted.

The capacitors $CD_2$, $CD_4$, $CD_5$, $CD'_5$ are de-coupling capacitors.

*Operation.*—Assuming the device to be connected across the terminals of the single-phase A. C. 220-volt network, when the filaments of the tubes T$u$1 and T$u$3 are heated to a sufficient degree a regulated 150-volt direct-current voltage will be obtained which is divided into two fractions of —90 v. and +60 v., respectively. When this condition is attained the safety control device is ready to operate.

As long as the operator does not depress either of the switches $I_1 \ldots I_4$, the tubes $Tu2$, $Tu4$, $Tu5$ remain in their non-conductive condition, because their grids are biased negatively in relation to their cathodes, as explained hereinabove, thereby preventing the relays $R_2$, $R_4$ and $R_5$ from being energized. As the double relay $R_5$—$R'_5$ is not energized the operative member or members of the machine cannot be actuated.

When the operator depresses simultaneously the interacting switches $I_1$ and $I_2$ with one hand, and the other interacting switches $I_3$ and $I_4$ with the other hand, the tube $Tu5$ is unlocked instantaneously and as a consequence its two grids receive the same cathode voltage so that the double relay $R_5$—$R'_5$ is energized; as a result on the one hand the circuits of both relays $R_2$ and $R_4$, and on the other hand the supply circuit leading to the control system of the operative member or members of the machine are opened.

If the operator depresses purposely or inadvertently a single set of switches, for example $I_1$—$I_2$, the operative member or members of the machine cannot be actuated for the following dual reason:

(1) The tube $Tu5$ is not conductive because one of its grids, controlled by the switch $I_3$, is still biased negatively with respect to the cathode, while the other is biased with the cathode voltage;

(2) The circuit of relays $R_5$ and $R'_5$ is opened after some time, depending on the discharge of capacitor $C_1$ through the potentiometer $P_1$, by the contact $F_5$ opened by the supply of voltage to the relay $R_2$.

By simply releasing the set of switches $I_1$, $I_2$ the apparatus is again ready to operate.

Figure 2:
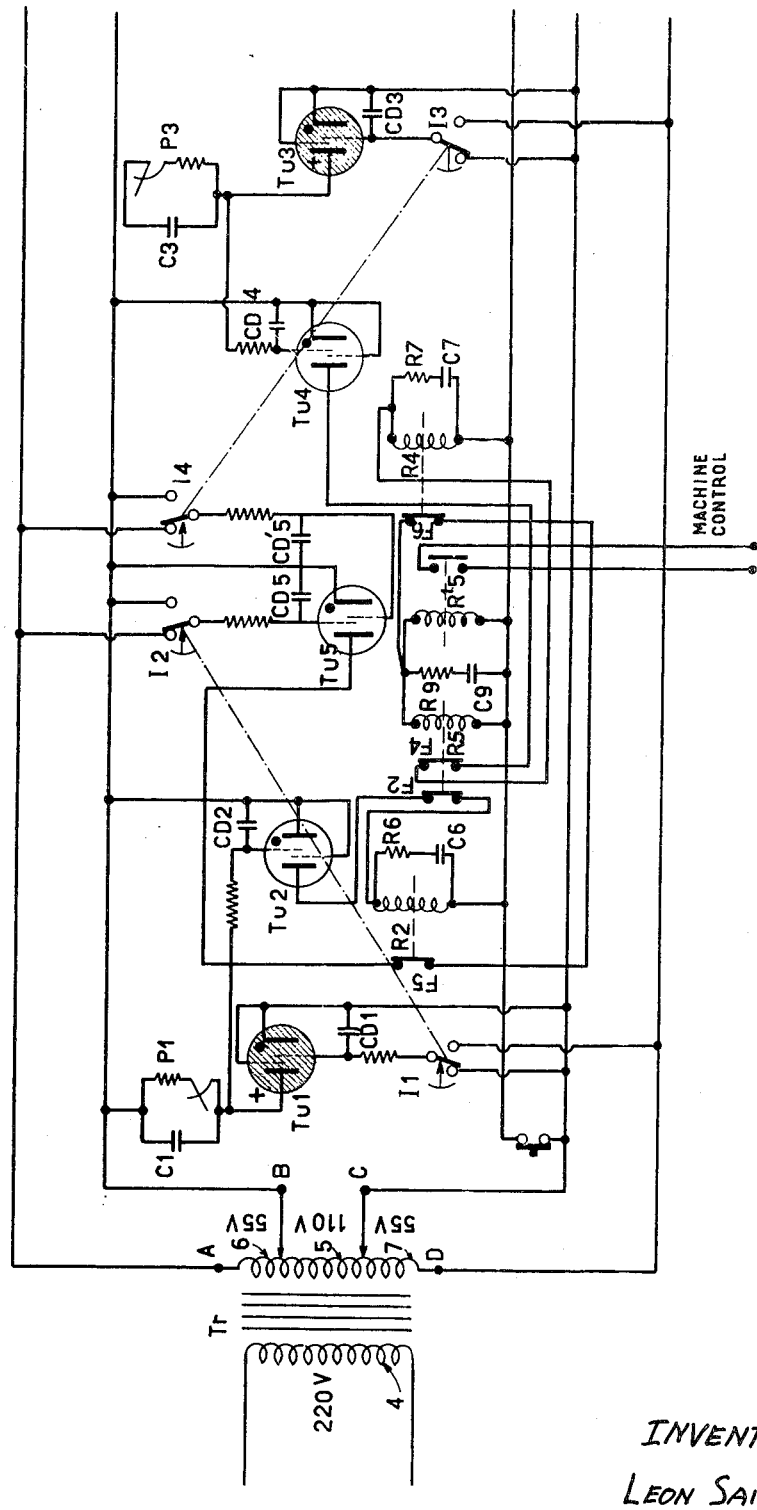
Figure 2 is another wiring diagram showing a similar device fed directly with alternating current.

In the form of embodiment shown in Fig. 2 relating to an apparatus fed directly with alternating current, this apparatus comprises:

An input transformer $Tr$ having a plurality of input terminals whereby its primary 4 can be connected to any single-phase A. C. network (in this case, a 220-volt 50-C. P. S. A. C.), the secondary of this transformer having the following functions:

(a) To supply voltage to the filaments of Thyratron tubes type 2.050 (not shown in Fig. 2) to be mentioned presently;

(b) To supply voltage to a single-phase A. C. 220-volt circuit divided into three portions, namely, an intermediate portion in the 5 to 110-volt range situated between the terminals B and C, and two extreme portions each of 55 volts, designated by the reference numerals 6 and 7, and situated the one between the terminals A and B, and the other between the terminals C and D;

Two identical electronic circuits each consisting of a pair of Thyratron tubes type 2.050, designated by the symbols $Tu1$, $Tu2$, or $Tu3$, $Tu4$, one of the tubes $Tu1$ or $Tu3$ having inserted in its grid circuit a control switch $I_1$ or $I_3$, and, in its anode circuit a capacitor-potentiometer unit $C_1$—$P_1$ or $C_3$—$P_3$ while the anode circuit of the other tube $Tu2$ or $Tu4$ comprises a relay $R_2$ or $R_4$ having mounted in multiple therewith a capacitor and resistor unit $C_6$—$R_6$ or $C_7$—$R_7$ and, in series with each of these units, a relay back contact $F_2$ or $F_4$;

An electronic circuit comprising:

(a) A Thyratron tube $Tu5$, type 2.050;

(b) A pair of switches $I_2$, $I_4$ controlling the grid bias of the tube and operatively connected to the switches $I_1$, $I_3$ respectively;

(c) A double relay $R_5$—$R'_5$ having connected across its terminals a capacitor $C_9$ and a resistor $R_9$ in series with each other, and a pair of relay back contacts $F_5$, $F_6$ in series with the assembly and controlled by the relays $R_2$ and $R_4$ respectively.

The capacitors $CD_1$, $CD_2$, $CD_3$, $CD_4$, $CD_5$, $CD$'s are de-coupling capacitors.

*Operation.*—Assuming the apparatus to be connected across the terminals of the supply network, the filaments of the five Thyratron tubes 2.050 are heated until the apparatus is ready to operate, which takes about thirty seconds. It is reminded here that the switches $I_1$ and $I_2$ are operatively connected, as well as the switches $I_3$ and $I_4$.

In the inoperative condition of the device the tubes $Tu1$ and $Tu3$ are ignited because their grids have the same voltage as their cathodes. The capacitors $C_1$ and $C_3$ are charged through the potentiometers $P_1$ and $P_3$ respectively and apply a negative bias to the grids of tubes $Tu2$ and $Tu4$ with respect to their cathodes. The relays $R_2$ in the circuit of tube $Tu2$, and $R_4$ in the circuit of tube $Tu4$ are therefore not energized. Moreover the tube $Tu5$ is not energized because its two grids are biased negatively with respect to its cathode. Therefore, the relays $R_5$ and $R'_5$ are not energized and the operative member or members of the machine cannot be actuated or started.

To put the machine in its operative condition the operator must depress simultaneously with one hand the interacting switches $I_1$, $I_2$ and with the other hand the interacting switches $I_3$, $I_4$. With this operation the tube $Tu5$ will be unlocked immediately since the grids thereof will have the same voltage as its cathode. Both relays $R_5$ and $R'_5$ are attracted instantaneously, thereby enabling the operative member or members of the machine to be actuated.

At the same time, both back contacts $F_2$ and $F_4$ are opened, thereby preventing the relays $R_2$ and $R_4$ from operating.

If, on account of a wrong move, one of the pair of interacting switches, for instance $I_1$—$I_2$, were wedged the tube $Tu1$ would not be conductive. After some time— the length of which varies with the value of the potentiometer $P_1$—the tube $Tu3$ becomes conductive and feeds the relay $R_2$ the contact $F_5$ of which opens the circuits through which the relays $R_5$ and $R'_5$ are energized; as a result, the operative member or members of the machine cannot be actuated.

Figure 3:
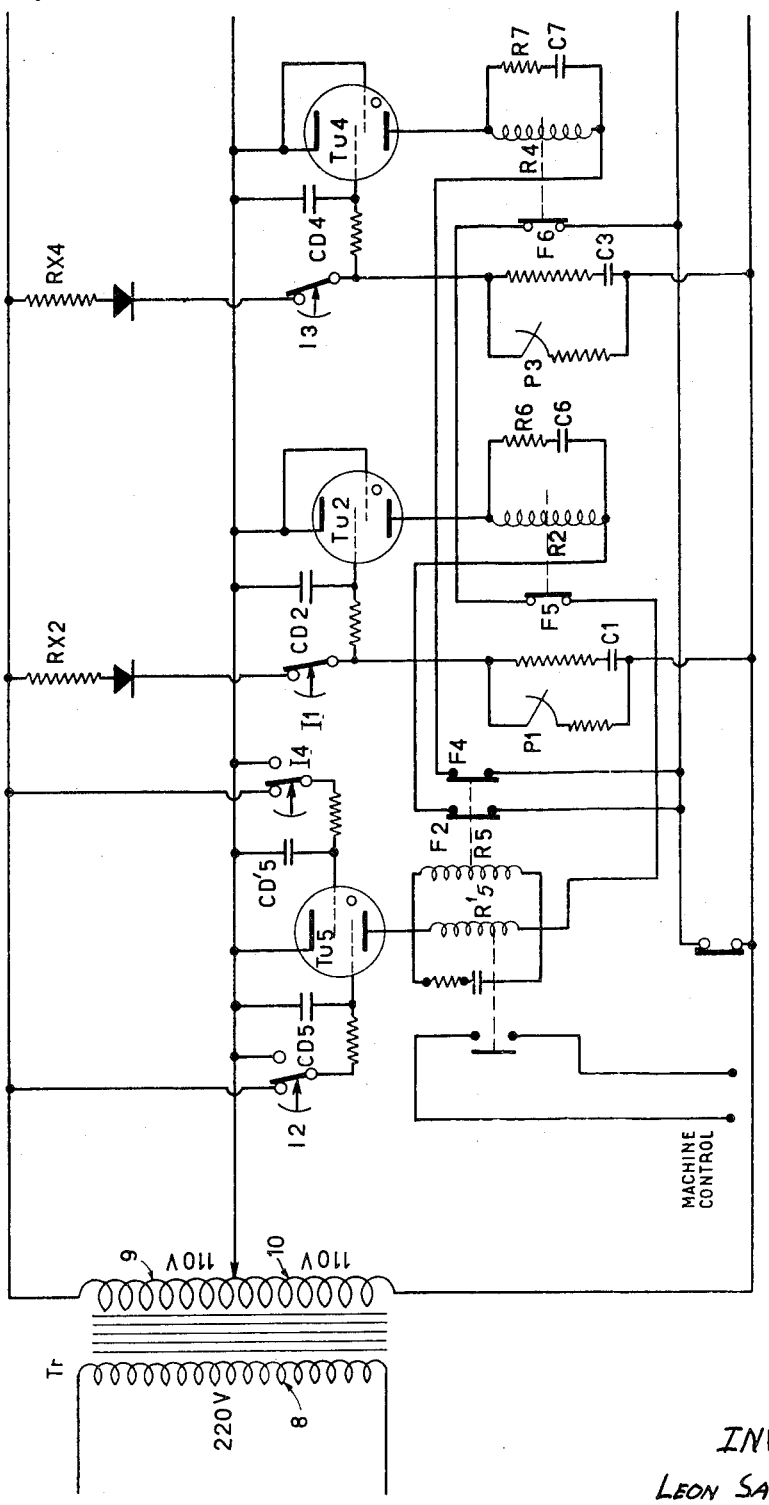
Figure 3 is a diagram representing a modified embodiment of the device illustrated in Fig. 2.

The device illustrated in Fig. 3 is a modified embodiment of the arrangement shown in Fig. 2 and described hereinabove, and its operation is substantially the same; the Thyratron tubes are locked and unlocked by acting on the grids thereof, the different relays being kept from operating according as the control buttons are depressed almost simultaneously or not.

The essential difference lies in the fact that the time constants are not determined by the locking of Thyratron tubes such as $Tu1$ and $Tu3$, but by breaking a circuit in which a dry rectifier $RX_2$ or $RX_4$ is inserted.

As will be seen from the wiring diagram of Fig. 3, the apparatus comprises as in the preceding example an input transformer $Tr$ having a plurality of terminals whereby the primary 8 thereof may be connected across the lead-in terminals of any desired single-phase A. C. network (in this case a 220-volt, 50-C. P. S. network) the secondary of the transformer having the following functions:

(a) To supply current to the filaments of the Thyratron tube, type 2.050, to be described presently;

(b) To supply current to a single-phase 220-v. A. C. circuit divided into two equal portions of 110 volts each.

The apparatus comprises, in addition, two identical electronic circuits each consisting of a dry rectifier $RX_1$ or $RX_2$ and a Thyratron tube $Tu2$ or $Tu4$ of the 2.050 type, a control switch $I_1$ or $I_3$, a capacitor-potentiometer unit $C_1$—$P_1$ or $C_3$ or $P_3$, and a relay $R_2$ or $R_4$ having mounted in parallel therewith a capacitor and resistor unit $C_6$—$R_6$ or $C_7$—$R_7$, then, in series with this last-mentioned unit, a relay back contact $F_2$ or $F_4$, all these elements associated with the tubes $Tu2$ and $Tu4$ being mounted and operating in the same manner as the device shown in Fig. 2.

Finally, the apparatus also comprises an electronic circuit having inserted therein a Thyratron tube $Tu5$ and comprising the same elements designated by the same reference symbols as those of the circuit shown in Fig. 2.

*Operation.*—When the filaments of the tubes T$u$2, T$u$4 and T$u$5 are heated to a sufficient degree, which takes about thirty seconds, the apparatus is ready to operate.

The switches I$_1$ and I$_2$ are interconnected, as well as the switches I$_3$, I$_4$.

During the inoperative periods of the operative member or members of the machine, both switches I$_1$ and I$_3$ are closed, so that a negative bias will be applied through the capacitors C$_1$ and C$_3$ connected to the terminals of the potentiometers P$_1$ and P$_3$ to the grids of the Thyratron with respect to their cathodes.

On the other hand, the switches I$_1$, I$_2$ and I$_3$, I$_4$ are inoperative, so that a negative bias is applied to both grids of the Thyratron tube T$u$5 with respect to the cathode thereof. Therefore, the tube T$u$5 is not conductive, both relays R$_5$ and R'$_5$ are not energized, and the operative member or members of the machine cannot be actuated.

If the interacting switches I$_1$ and I$_2$ are depressed simultaneously with one hand, and the other interacting switches I$_3$ and I$_4$ are depressed with the other hand, the Thyratron tube T$u$5 will become immediately conductive, both relays R$_5$ and R'$_5$ will be energized and their contacts will permit of actuating the operative members of the machine. At the same time the closed contacts F$_2$ and F$_4$ of relays R$_5$—R'$_5$ are opened and break the circuit of both relays R$_2$ and R$_4$. Should the operator inadvertently depress a single set of switches only, for instance the switches I$_1$ and I$_2$, the operative members of the machine will not be started on account of a dual locking action resulting from the fact that:

(a) The tube T$u$5 is not conductive because there is constantly one grid having a negative voltage with respect to its cathode;

(b) After a variable time period resulting from the discharge of the capacitor C$_1$ in the potentiometer P$_1$, the relay R$_2$ will be energized and its corresponding contact F$_5$ will open the anode circuit of the tube T$u$5.

By simply releasing one set of switches I$_1$ and I$_2$ the apparatus will resume its initial condition to permit another operation.

The safety devices described hereinabove with reference to the drawings are intended for a single operator and the latter is compelled to use both hands for controlling the member or members of the machine.

Figure 4:
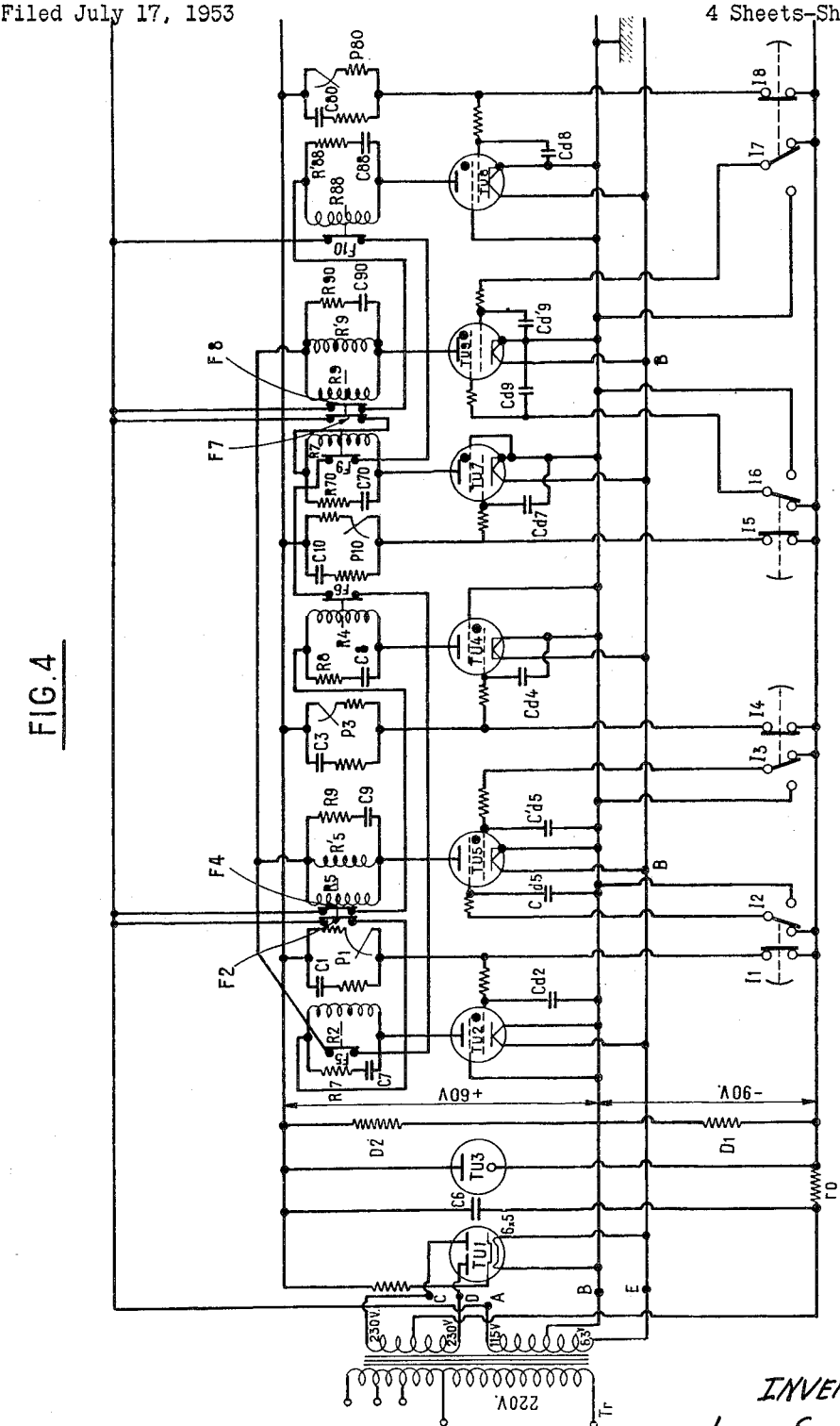
Figure 4 is a diagram showing a modified embodiment of the device illustrated in Fig. 1, but designed for two operators instead of a single operator.

In many cases the machine is in charge of a plurality of operators, for example two or four; the device shown in Fig. 4 is intended to secure the same conditions of safety to two operators. In this device, each operator is confronted with two sets of control buttons or levers designated by the reference symbols I$_1$, I$_2$ and I$_3$, I$_4$ respectively, for the first operator as in the preceding case, and I$_5$, I$_6$ and I$_7$, I$_8$ for the other operator.

To each set of control elements corresponds the same circuit arrangement as that shown notably in Fig. 1 and positioned after the rectifier tube T$u$1, the filter C$_6$, r$_6$, T$u$3 and the direct voltage divider D$_1$—D$_2$, which are positioned before as in Fig. 1, and are common. The only important difference is that the four locking contacts, namely F$_5$, F$_6$ for the first set and F$_9$, F$_{10}$ for the other set, are mounted in series in the circuit of the control relays R$_5$, R'$_5$, R$_9$ and R'$_9$.

With this exception, the apparatus shown in Fig. 4 comprises the circuits or members, designated by the same reference symbols as in the case of the device of Fig. 1, plus the circuits and elements required for the two additional sets of switches, which are as follows:

Two electronic circuits each comprising: (a) A capacitor-potentiometer unit C$_{10}$—P$_{10}$ or C$_{80}$—P$_{80}$, connected across the terminals of the 150-volt regulated D. C. network having inserted in its circuit a switch I$_5$ or I$_8$ and the purpose of which consists in applying a negative bias to the grid of a Thyratron tube T$u$7 or T$u$8 to be mentioned presently, with respect to its cathode;

(b) A circuit connected across the central tap of the voltage divider and the 110-volt A. C. supply, this circuit comprising in series:

(b$^1$) An electron tube T$u$7 or T$u$8;

(b$^2$) A relay R$_7$ or R$_{88}$, having connected across its terminals, in series, a capacitor C$_{70}$ or C$_{88}$ and a resistor R$_{70}$ or R$_{88}$, and a relay back contact F$_7$ or F$_8$;

An electronic circuit connected at one end to the centre tap B of the voltage divider, and at the other end to an A. C. 110-volt supply circuit comprising:

(a) A Thyratron tube T$u$9 type 2.050;

(b) Two switches I$_6$ or I$_7$ controlling the grid bias of this tube;

(c) A double relay R$_9$—R'$_9$ having connected across its terminals, in series, a capacitor C$_{90}$ and a resistor R$_{90}$, and, in series with the assembly, the relay contacts F$_9$, F$_{10}$ mounted in the manner indicated hereabove.

With this specific arrangement, both operators must depress substantially at the same time and with both hands the control buttons or levers at their disposal, otherwise the dangerous operative member or members of the machine will remain locked against motion. The operation is as follows. When each operator depresses his respective hand-controlled switches the two relays R$_5$, R'$_5$ and R$_9$, R'$_9$ are energized so that contacts F$_2$, F$_4$, F$_7$, F$_8$ are opened and consequently contacts F$_5$, F$_6$, F$_9$, and F$_{10}$ remain closed since their circuits have been opened. Relays R$_5$, R'$_5$ and R$_9$, R'$_9$ can only be energized so long as the series contacts F$_5$, F$_6$, F$_9$, and F$_{10}$ are maintained closed. Assuming that one of the operators closes switches 11—12 and 13—14 ahead of the other then relays R$_2$ and R$_4$ are energized. These latter relays will open contacts F$_5$ and F$_6$ preventing relays R$_5$, R'$_5$ from being energized. Accordingly relay winding R'$_5$ will not actuate the contact closing one of the machine control circuits (not shown on Fig. 4 but shown on Fig. 1).

Of course, the multiple safety device of the type illustrated in Fig. 4 may also be designed according to the forms of embodiment shown in the other figures of the drawings.

On the other hand, various modifications and alterations may be brought to the different forms of embodiment shown in the drawings and described hereinabove, without departing however from the spirit and scope of the invention, as defined in the appended claims.

I claim:

1. In a safety apparatus for hand controlled machines the operation of which is dangerous to an operator, a power supply means having voltage dividing means, at least two like electronic circuits each including a thyratron tube having at least one grid, a hand controlled switch connected to said power supply means and said tube grid to provide grid control means, a relay having its winding in series with said tube, a time-delay branch circuit connected between the grid of said tube and said supply means, a pair of normally closed contacts in series with the tube and said relay winding, at least one other electronic circuit and said like electronic circuits all connected to said supply means, said other electronic circuit comprising a third thyratron tube having a pair of grids, two control switches each in series with one of said tube grids and connected to said supply means, said control switches being interconnected with said hand-controlled switches so that simultaneous activation of both hand-controlled switches will cause said third tube to start discharging and the activation of only one hand-controlled switch will not, a differential relay having two parallel relay windings in series with said third tube, two pairs of contacts in series with said third tube, said pairs of contacts being normally closed and adapted to be opened by said relays connected in series with the other tubes, said differential relay being adapted to open the contacts in series with the other tubes and to place said machine in operative condition.

2. Safety apparatus in accordance with claim 1, in which said power supply means include an alternating current source and said like electronic circuits include a rectifier connected between one side of said alternating current source and one terminal of each hand-controlled switch, said switch having its opposite terminal connected to the grid of its associated thyratron tube.

3. A safety apparatus in accordance with claim 1, in which a series-connected resistor and capacitor are connected in parallel with each of said relay windings.

4. A safety apparatus in accordance with claim 1, in which said differential relay has two parallel windings, one of said windings being arranged to open the contacts in series with the other tubes in said electronic circuits, and the other of said windings is adapted to close contacts energizing a circuit to start said machine.

5. A safety apparatus in accordance with claim 1, in which said machine requires two operators and said hand-controlled switches comprise two pairs of switches and having associated control switches, said like electronic circuits comprising four circuits and said other electronic circuits comprising two circuits, said like electronic circuits having their associated other circuits interconnected so that simultaneous operation of said sets of hand-controlled switches is necessary to put said machine in an operative condition.

6. A safety apparatus in accordance with claim 1, in which said power supply means comprises a single phase alternating current circuit, and said electronic circuits include an additional thyratron tube having an anode, a cathode, and at least one grid, said anode being connected to said time-delay circuit of said electronic circuit, said hand-controlled switch being connected to said grid of said additional tube, said cathode being connected to said alternating current circuit at the same potential as said grid so that said tube is ignited while said hand-controlled switch is inoperative, said hand-controlled switch being arranged to connect the grid of said additional tube to different potential points on said alternating current circuit so as to bias it with respect to said cathode.

7. A safety apparatus for hand controlled machines the operation of which is dangerous to an operator comprising: an alternating current source, coupling means between said supply source and circuits of said safety apparatus, a direct current supply network comprising rectifying and regulation means connected to said coupling means, a filter connected across said network, a voltage divider connected across said network, at least two like electronic circuits each including a thyratron tube, a relay winding in series with said tube, a hand-controlled switch connected between the grid of tube and a negative potential point on said network to control the discharge of said tube, a time-delay circuit connected between the grid of the tube and a point on the direct current network which is positive with respect to said negative potential point, a pair of normally closed contacts in series with the tube and relay winding, at least one other electronic circuit connected at one point to said voltage dividing means and at the other to said alternating supply source by means of said coupling means and comprising a thyratron tube having a pair of grids, two control switches each in series with one of said tube grids and connected to said direct current network, said control switches being interconnected with said hand-controlled switches so that simultaneous activation of both hand-controlled switches will cause said third tube to start discharging and the activation of only one hand-controlled switch will not, a differential relay having two parallel relay windings in series with said third tube, two pairs of contacts in series with said third tube, said pairs of contacts being normally closed and adapted to be opened by said relays connected in series with the other tubes, said differential relay being adapted to open the contacts in series with the other tubes and to place said machine in operative condition.

References Cited in the file of this patent

UNITED STATES PATENTS 2,612,743    Strother _____ Oct. 7, 1952